US012561917B2

(12) United States Patent
Fricker et al.

(10) Patent No.: US 12,561,917 B2
(45) Date of Patent: Feb. 24, 2026

(54) DEVICE AND METHOD FOR EVALUATING A PERFORMANCE OF A VISUAL EQUIPMENT FOR A VISUAL TASK

(71) Applicant: ESSILOR INTERNATIONAL, Charenton-le-Pont (FR)

(72) Inventors: Sébastien Fricker, Charenton-le-Pont (FR); Konogan Baranton, Charenton-le-Pont (FR); Delphine Tranvouez-Bernardin, Charenton-le-Pont (FR); Cyril Guilloux, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 1161 days.

(21) Appl. No.: 17/441,489

(22) PCT Filed: Mar. 19, 2020

(86) PCT No.: PCT/EP2020/057643
§ 371 (c)(1),
(2) Date: Sep. 21, 2021

(87) PCT Pub. No.: WO2020/193370
PCT Pub. Date: Oct. 1, 2020

(65) Prior Publication Data
US 2022/0175240 A1 Jun. 9, 2022

(30) Foreign Application Priority Data
Mar. 22, 2019 (EP) ..................................... 19305360

(51) Int. Cl.
*A61B 3/103* (2006.01)
*A61B 3/113* (2006.01)
(Continued)

(52) U.S. Cl.
CPC ............ *G06T 19/003* (2013.01); *G06T 15/20* (2013.01); *G06T 7/20* (2013.01)

(58) Field of Classification Search
CPC ......... G06T 19/003; G06T 15/20; G06T 7/20; A61B 3/0025; A61B 3/0041; A61B 3/103; A61B 3/113
See application file for complete search history.

(56) References Cited

U.S. PATENT DOCUMENTS 7,731,359 B2 6/2010 Guilloux et al.
8,128,226 B2 3/2012 Guilloux et al.
(Continued)

FOREIGN PATENT DOCUMENTS

CN 101075021 A 11/2007
CN 102165362 A 8/2011
(Continued)

OTHER PUBLICATIONS

Office Action, issued in Chinese Patent Application No. 202080023011.5 dated May 23, 2024.
(Continued)

*Primary Examiner* — Thomas C Lee
*Assistant Examiner* — Michael V Farina
(74) *Attorney, Agent, or Firm* — NIXON & VANDERHYE

(57) ABSTRACT

A device for evaluating a performance of a target visual equipment for a visual task includes: at least one input adapted to obtain data) representative as a function of time of measurements of at least one parameter associated with an initial wearer of an initial visual equipment performing the task in a scene, obtain a model of the scene, of a target wearer; at least one processor configured for virtually performing the task with the target equipment by using the scene and target wearer models, and by applying the repre- (Continued)

sentative data) as a function of time to the target wearer model; determining, on the basis of the virtual performing, at least one parameter of interest; providing the same, to determine to which extent the target equipment is appropriate for the target wearer, by evaluating the performance of the target equipment as a function of the parameter of interest.

20 Claims, 4 Drawing Sheets

(51) Int. Cl.
    *G06T 15/20*       (2011.01)
    *G06T 19/00*       (2011.01)
    *G06T 7/20*        (2017.01)

(56)         References Cited

U.S. PATENT DOCUMENTS

| | | |
|---|---|---|
| 8,985,766 B2 | 3/2015 | Suzuki et al. |
| 9,706,910 B1 | 7/2017 | Blaha et al. |
| 10,451,894 B2 | 10/2019 | Calixte et al. |
| 10,582,876 B2 | 3/2020 | Suzuki et al. |
| 2003/0107707 A1 | 6/2003 | Fisher et al. |
| 2009/0214086 A1 | 8/2009 | Thomet |
| 2009/0228810 A1* | 9/2009 | Shinohara ............... G06T 15/20 |
| | | 715/757 |
| 2012/0011457 A1* | 1/2012 | Habets .................. G06T 19/003 |
| | | 715/849 |
| 2014/0028973 A1 | 1/2014 | Scolaro |
| 2016/0140773 A1 | 5/2016 | Yajima |
| 2016/0147083 A1 | 5/2016 | Stevens |
| 2016/0327813 A1 | 11/2016 | Baranton et al. |
| 2017/0031179 A1 | 2/2017 | Guillot |
| 2017/0059886 A1 | 3/2017 | Fayolle |
| 2018/0101023 A1 | 4/2018 | Granger |
| 2018/0136486 A1* | 5/2018 | Macnamara ............. A61B 3/00 |
| 2018/0161101 A1* | 6/2018 | Barsoum ................. A61F 2/468 |
| 2018/0299694 A1 | 10/2018 | Rousseau et al. |
| 2019/0113770 A1* | 4/2019 | Tranvouez-Bernardin .................. |
| | | A61B 3/113 |

FOREIGN PATENT DOCUMENTS

| | | |
|---|---|---|
| CN | 105607255 A | 5/2016 |
| CN | 105705982 A | 6/2016 |
| CN | 106030382 A | 10/2016 |
| CN | 106030384 A | 10/2016 |
| CN | 107111157 A | 8/2017 |
| CN | 107407824 A | 11/2017 |
| CN | 108139600 A | 6/2018 |
| CN | 108474970 A | 8/2018 |
| CN | 109222970 A | 1/2019 |
| EP | 2098902 A1 | 9/2009 |
| FR | 2892529 A1 | 4/2007 |
| FR | 2898193 A1 | 9/2007 |
| JP | 2009238204 A | 10/2009 |
| JP | 2014026280 A | 2/2014 |
| JP | 2015094917 A | 5/2015 |
| JP | 2016528523 A | 9/2016 |
| WO | 2015/124574 A1 | 8/2015 |
| WO | 2017/064065 A1 | 4/2017 |
| WO | 2017/157760 | 9/2017 |
| WO | 2017157760 A1 | 9/2017 |

OTHER PUBLICATIONS

International Search Report for PCT/EP2020/057643, mailed May 18, 2020, 4 pages.

Written Opinion of the ISA for PCT/EP2020/057643, mailed May 18, 2020, 7 pages.

Extended Search Report for EP19305360.9, dated Oct. 10, 2019, 8 pages.

Office Action, issued in Chinese Patent Application No. 202080023011.5 dated Nov. 29, 2023.

Office Action issued in Japanese Patent Application No. 2021-556800 dated Jul. 31, 2023.

Office Action, issued in Japanese Patent Application No. 2021-556800 dated Feb. 5, 2024.

Office Action, issued in Brazilian Patent Application No. BR112021018234-9 dated Sep. 18, 2025.

* cited by examiner

DEVICE AND METHOD FOR EVALUATING A PERFORMANCE OF A VISUAL EQUIPMENT FOR A VISUAL TASK

This application is the U.S. national phase of International Application No. PCT/EP2020/057643 filed 19 Mar. 2020, which designated the U.S. and claims priority to EP Patent Application No. 19305360.0 filed 22 Mar. 2019, the entire contents of each of which are hereby incorporated by reference.

FIELD OF THE INVENTION

The present invention relates to a device and method for evaluating a performance of a visual equipment for a wearer of that visual equipment to perform at least one visual task.

BACKGROUND OF THE INVENTION

When a visual equipment such as an ophthalmic lens or a solar lens is worn by a wearer to perform a given visual task, the performance of the visual equipment can be assessed in several ways: for example, the wearer may be asked to fill out a questionnaire after performing the visual task; or the performance of the wearer for the visual task may be evaluated in terms of speed, accuracy, repeatability, stability, etc.; or the wearer may be equipped with an electroencephalograph to record brain activity; or the wearer may be equipped with an eye-tracking device to record gaze directions; or the wearer may be equipped with a motion-tracking device to record body postures.

Document WO-A-2017/157760 describes a method for determining an ophthalmic lens adapted to a wearer, i.e. an ophthalmic lens having a performance considered as satisfactory, based on a locomotion parameter, for instance, an ophthalmic lens that minimizes the modification of the optical flow. The locomotion parameter may be the trajectory, speed, direction and/or movements of any part of the body of the wearer, for example the head or the eye. The locomotion parameters are measured by using sensors.

Indeed, modeling body movement of a human is so complex that it is often preferred to import data obtained from body motion capture. Such imported data is used for example in video games and special effects in movies, in order to reproduce realistic movement of humans.

It is also known, for example from document WO-A-2015/124574, to obtain the wearer's head or eye position, in order to determine an improved ophthalmic lens design.

However, the above prior art approaches do not make it possible to obtain accurate and objective information about parameters of interest related to the wearer, regarding the manner in which the wearer is using the visual equipment for the given visual task, for example regarding which gaze directions and object proximities the wearer is actually using.

Examples of such parameters of interest include the wearer's visual acuity or visual acuity loss during the performing of the visual task, distortion experienced by the wearer, the wearer's gaze effort, posture effort, level of accommodation, optical flow, vergence state, etc.

Currently, such information is not reliable and is inaccurate, because it is usually subjective, since it is mainly obtained through the wearer's subjective answers to questionnaires. Moreover, such subjective information makes data interpretation complex. Comparisons between wearers are also difficult because they are biased by subjectivity. In addition, subjective data is usually less repeatable or reproducible than objective data.

Moreover, comparing the performance of various visual equipments by equipping the wearer with an electroencephalograph to record brain activity is also subject to difficulties: a given experiment must be repeated for each visual equipment and the comparison may be difficult if the wearer is not executing the visual task in the same manner with the various visual equipments. The order in which various visual equipments are evaluated may also impact the results of the comparison, given that a lens of a given visual equipment being evaluated may have an effect on the wearer's vision through the lens of the following visual equipment being evaluated.

Thus, there is currently no satisfactory solution for evaluating in an objective manner a performance of a visual equipment for a wearer of the visual equipment to carry out a given visual task, by obtaining objective information about predetermined parameters of interest.

SUMMARY OF THE INVENTION

An object of the invention is to overcome the above-mentioned drawbacks of the prior art.

To that end, the invention provides a device for evaluating a performance of a target visual equipment for at least one visual task, wherein it comprises:

at least one input adapted to:

obtain data representative as a function of time of measurements of at least one parameter associated with an initial wearer of an initial visual equipment performing the at least one visual task in a scene;

obtain a model of the scene where the at least one visual task is performed;

obtain a model of a target wearer;

at least one processor configured for:

virtually performing the at least one visual task with the target visual equipment by using the scene model and the target wearer model, and by applying the representative data as a function of time to the model of the target wearer having the target visual equipment in performing the visual task in the model of the scene;

determining, on the basis of the virtual performing, at least one parameter of interest;

providing the at least one parameter of interest, so as to determine to which extent the target visual equipment is appropriate for the target wearer, by evaluating the performance of the target visual equipment as a function of the at least one parameter of interest.

Therefore, objective information about parameters of interest is obtained and may then be possibly correlated with subjective evaluations in order to better understand and better model the wearer's experience.

This makes it possible to determine the most appropriate visual equipment for a target wearer to perform the considered visual task(s), for example by comparing several visual equipments in terms of their impact on the considered parameter(s) of interest.

The invention also provides a method for evaluating a performance of a target visual equipment for at least one visual task, wherein it comprises:

obtaining data representative as a function of time of measurements of at least one parameter associated with an initial wearer of an initial visual equipment performing the at least one visual task in a scene;

obtaining a model of the scene where the at least one visual task is performed;

obtaining a model of a target wearer;

virtually performing by at least one processor the at least one visual task with the target visual equipment by using the scene model and the target wearer model, and by applying the representative data as a function of time to the model of the target wearer having the target visual equipment in performing the visual task in the model of the scene;

determining by at least one processor, on the basis of the virtual performing, at least one parameter of interest;

providing the at least one parameter of interest, so as to determine to which extent the target visual equipment is appropriate for the target wearer, by evaluating the performance of the target visual equipment as a function of the at least one parameter of interest.

In particular modes, that method for evaluating is executed by the device for evaluating according to the disclosure, in any of its embodiments.

The invention further provides a computer program product for evaluating a performance of a target visual equipment for at least one visual task, wherein it comprises one or more sequences of instructions that are accessible to a processor and that, when executed by the processor, cause the processor to:

obtain data representative as a function of time of measurements of at least one parameter associated with an initial wearer of an initial visual equipment performing the at least one visual task in a scene;

obtain a model of the scene where the at least one visual task is performed;

obtain a model of a target wearer;

virtually perform the at least one visual task with the target visual equipment by using the scene model and the target wearer model, and by applying the representative data as a function of time to the model of the target wearer having the target visual equipment in performing the visual task in the model of the scene;

determine, on the basis of the virtual performing, at least one parameter of interest;

provide the at least one parameter of interest, so as to determine to which extent the target visual equipment is appropriate for the target wearer, by evaluating the performance of the target visual equipment as a function of the at least one parameter of interest.

The computer program product is advantageously configured for executing the method according to the disclosure, in any of its execution modes.

As advantages of the method and the computer program product are similar to those of the device, they are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF EMBODIMENTS

Figure 1:
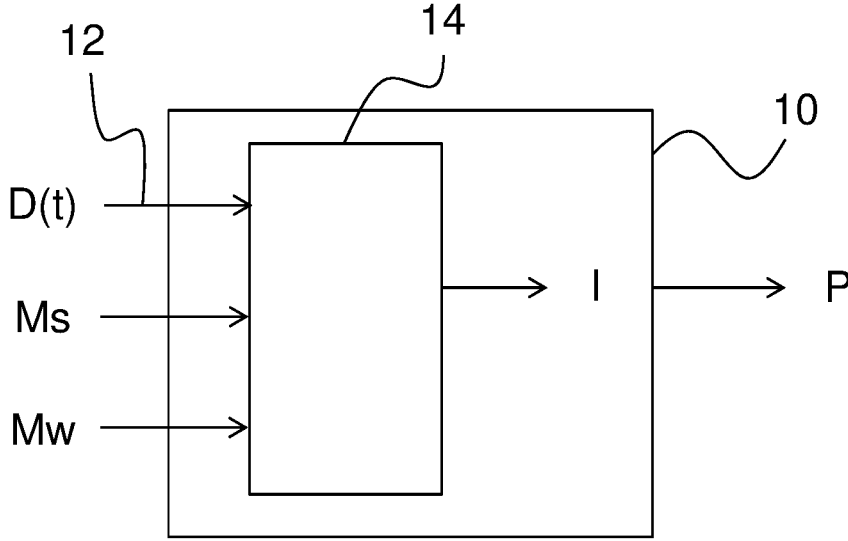
FIG. 1 is a schematic view of a device according to the invention, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

As shown in FIG. 1, in a particular embodiment, a device 10 for evaluating a performance of a target visual equipment for a target wearer of that visual equipment to perform at least one visual task comprises one or more inputs 12 adapted to obtain data D(t) representative, as a function of time, of measurements of at least one parameter of an initial wearer of an initial visual equipment performing the visual task in a scene.

The visual task(s) may for example be walking and climbing stairs.

The one or more inputs 12 are also adapted to obtain a model Ms of a scene where the visual task is performed and a model Mw of the target wearer.

Each of the initial visual equipment and the target visual equipment may be an ophthalmic lens or pair of ophthalmic lenses, possibly active lenses, or a solar lens or pair of solar lenses, or an ophthalmic solar lens or pair of ophthalmic solar lenses. It may be in the form of glasses or contact lenses or intra-ocular lenses. For example, it may be a pair of progressive lenses.

The initial wearer and the target wearer may be either real persons, or virtual beings, representative of a predetermined group of users or deemed to be average users. The expression "the target wearer" means that the person or virtual being is wearing the target visual equipment the performance of which is to be evaluated.

The initial and/or target wearer may be chosen from a database of multiple initial wearers, in which the wearers are organized in clusters according to a particular characteristic, such as age, gender, ethnicity, activity, refraction, size, handedness, etc., or according to behavioral parameters, such as head/eye coordination, etc.

Similarly, the characteristics of the target visual equipment may be selected among real existing equipments, or constructed as desired, as a virtual visual equipment.

The device 10 may comprise a user interface making it possible, for a user of the device 10, to enter, for example by means of a keyboard and/or a mouse and/or a touch screen, data such as, for example, the cluster to which the initial and/or target wearer belongs, as well as any other information that may have an impact on the model Mw of the target wearer.

The initial and target wearers may be identical to each other.

The target wearer may be modeled as a set of rigid body parts/segments capable of moving with respect to each other.

The model Mw of the target wearer may for example comprise a head, at least one eye movable with respect to the head and at least one ophthalmic and/or solar lens of the target visual equipment cooperating with the eye in front of which it is positioned.

The eye motion may for example be defined by two angles describing eye gaze directions: lowering and azimuth. Optionally, the torsion of the eye may be measured with an eye tracking device, by the rotation of the iris texture, and can be determined, for example according to Listing's law.

For details about Listing's law, reference may be made e.g. to "K. N. Kinematics of normal and strabismic eyes", in Ciuffreda K., Schor C., "Basic and Clinical Aspects of Binocular Vergence Movements", Butterworths, 1983, pages 544-564.

The lenses may be defined by their geometry i.e. shape, and their material or refractive index, coating, transmission, reflections on rear face, position, etc.

It may be assumed that the position of the lenses with respect to the head is fixed for the duration of the visual task.

Optionally, the model Mw of the target wearer may further comprise a modeled trunk or torso, the head being movable with respect to the trunk.

Optionally, the model Mw of the target wearer may further comprise other parameters relating to the target wearer, such as data relating to the size of the target wearer and/or the manner in which the target wearer is walking, a particular type of visual deficiency of the target wearer, e.g. myopia or hypermetropia, etc.

The device 10 also comprises at least one processor 14.

According to the disclosure, the processor 14 is configured for virtually performing the at least one visual task with the target visual equipment by using the scene model Ms and the target wearer model Mw, and by applying the obtained representative data as a function of time D(t) to the model Mw of the target wearer having the target visual equipment in performing the visual task in the model Ms of the scene.

Said target wearer (physical or virtual) and target visual equipment (physical or virtual) are defined by some characteristics, which are taken into account in the model of the scene Ms and in the model of the target wearer Mw.

As a non-limiting example, the obtained representative data D(t) may pertain to at least one of the position, as a function of time, of the head of the initial wearer with respect to a predetermined reference frame, for example a "main" reference frame of the scene, and at least one gaze direction, as a function of time, of one eye, of the initial wearer during the visual task.

The gaze direction or head position is not necessarily measured: it may be induced in any appropriate manner.

For example, if the head position and the fixation point are known, then the gaze directions can be inferred by ray-tracing between the centers of rotation of the eyes and the fixation point.

As another example, if the gaze directions and the fixation point are known, then the head position can be determined as follows:

1) Consider an initial head position.
2) Apply known gaze directions and perform ray tracing through the lenses.
3) Compute the intersection between the two emerging rays or, if they do not intersect, the closest point between the two emerging rays.
4) Compute the distance between the intersection of the emerging rays and the fixation point.
5) Find, for example by a local optimization method, the head position that minimizes the distance between the intersection of the emerging rays and the fixation point.

As another example, if the fixation point and the trunk position are known, head position and gaze directions can be determined by assuming vertical and horizontal head-eye coordination ratios k_vertical and k_horizontal, for example k_vertical=k_horizontal=0.3. For example, the head motion may be described by three angles theta, phi and rho, corresponding respectively to head pitch, yaw and roll. For example, the transformation matrix from a reference frame of the trunk to a reference frame of the head may be the combination of a rotation about an X-axis of an angle equal to k×theta, a translation about an Y-axis, orthogonal to the X-axis, of a distance equal to the trunk to head distance, a rotation about a Z-axis, orthogonal to the X-axis and to the Y-axis, of an angle equal to rho, a rotation about the X-axis of an angle equal to (1−k)×theta and a rotation about the Y-axis of an angle equal to phi, where k=0.22. The head rotation angles (theta, phi) and the eye rotation angles (alpha, beta) are then determined such that the emerging ray intersects the fixation point such that phi=k_vertical×alpha and theta=k_horizontal×beta.

The representative data D(t) may also pertain to the position of so-called fixation points, also referred to as fixations, i.e. points being looked at by at least one eye of the initial wearer, at respective time instants during the performing of the visual task.

The position of those fixation points may be either measured directly, or computed upstream, before being provided to the device 10. The fixation points may be derived from received gaze directions (as described hereafter) and/or head position, the gaze directions being possibly given by a model.

For example, the fixation point location can be inferred from the head movement and the saliency map, as described in the article by R. Nakashima et al. entitled "Saliency-based gaze prediction based on head direction", in Vision Research, vol. 117, December 2015, pages 59-66, Elsevier.

As another example, if the feet position is recorded, the fixation point location can be inferred as the feet position, with an anticipation of one or two steps or 1.5 s.

As another example, if the visual task includes stair climbing, the head movement can also be used for locating the fixation points: when the head is upward, the fixation point is set at the top of the stairs or a point of interest close by. When the head turns downward, the fixation point can be simultaneously set at the future position of the feet, with an advance or anticipation of 1.5 s.

Optionally, the representative data D(t) may also pertain to the position, as a function of time, of the trunk of the initial wearer with respect to the predetermined reference frame. Other representative data D(t) may be obtained.

Thus, in a particular embodiment, in virtually performing the visual task, the processor 14 is configured for applying as a function of time at least one of the above-mentioned at least one eye gaze direction, the above-mentioned position of the head and the above-mentioned position of the trunk of the initial wearer to the model Mw of the target wearer.

In an embodiment where the representative data D(t) result from direct measurements on the initial wearer, for example measurements of the gaze direction and/or of the initial wearer's motion, for obtaining such measurements, the initial wearer may for example be equipped with a gaze tracking device and/or a motion tracking device for the duration of the visual task.

According to the disclosure, the processor 14 is also configured for determining, on the basis of the virtual performing, at least one parameter of interest I and for providing the at least one parameter of interest I, so as to determine to which extent the target visual equipment is appropriate for the target wearer.

For example, ray tracing is performed from the fixation point(s) and/or any point of the virtual environment and passing through the lens(es), eye(s) rotation center(s) or pupil center(s). Then, optical data such as the apparent object position can be computed. Thanks to models, those data are used and translated into visual acuity drop and/or efforts.

The parameter of interest I may relate to visual acuity or accommodation. By way of non-limiting examples, it may be the monocular visual acuity for the target wearer's left and/or right eye, the monocular visual acuity loss for the target wearer's left and/or right eye, the binocular visual acuity, the binocular visual acuity loss, the accommodation level, the optical flow, the distortion, the vergence state, posture efforts, postural adaptation, fatigue strains and/or movement costs.

The extent to which the target visual equipment is appropriate for the target wearer is determined by evaluating a performance P of the target visual equipment as a function of the at least one parameter of interest I.

By way of non-limiting examples, the performance can be directly the average value of the parameter of interest over the entire visual task, thresholds such as "good", "bad" can be defined for the parameter of interest, or the performance may be an average score of different parameters of interest and/or for different visual tasks.

Said parameter of interest is a non-zero parameter which varies over time. Therefore, an ophthalmic prescription cannot be a parameter of interest.

The initial visual equipment is the equipment onto which the representative data is based on. The target visual equipment is the equipment used in the virtual performing step to obtain the parameter of interest.

As another example, for comparing two visual equipments, the values of the parameters of interest of both visual equipments can be compared. Thus, the best visual equipment may be the visual equipment that gives higher visual acuity or lower visual acuity loss, or the visual equipment that generates less distortion, or the visual equipment that generates less optical flow deformation. . .

The model Ms of the scene may comprise at least one object defined by at least one geometric parameter and by a position of the object in the scene. The scene may be made of tridimensional objects in a tridimensional environment.

Other features of the scene may be included in the model Ms, including color, texture, contrast, light sources, etc.

The shape of an object may comprise geometric forms such as points, lines, rectangles, spheres, parallelepipeds, triangular meshes and/or quad meshes. The position of an object in the scene may be defined with respect to a predetermined reference frame.

For example, the position of an object with respect to a main reference frame of the scene may be described by using a rotation matrix R and a translation matrix T. For example, the rotation matrix R is a 3×3 matrix and the translation matrix T is a 3×1 vector.

The coordinates of a given point in the reference frame of an object are given by a triplet Po and the coordinates of that point in the main reference frame are given by a triplet Pm. The transformation from the main reference frame to the reference frame of the object is given by (R, T) such that Po=R×Pm+T.

Each object may thus be defined by its geometry and the transformation (R, T).

The visual task may comprise a sequence of fixation points, i.e. points to be looked at in the scene. Optionally, the time instant at which each point is looked at may be included in the visual task.

Thus, the processor 14 may be configured for determining the position of the fixation points of at least one eye of the initial wearer, at respective time instants during the performing of the visual task.

For doing so, the processor 14 may for example carry out following operations:

1) compute the position of the Center of Rotation of the Eye (CRE) for the right eye;
2) compute the position of the right lens;
3) perform a ray tracing originating from the CRE of the right eye, in the gaze direction of the right eye, through the right lens, so as to obtain an emerging ray;
4) compute the intersection (or closest distance) between the emerging ray and all objects of the scene. Then, the object the intersection of which is the closest to the lens along the direction of the emerging ray gives the fixation point for the right eye;
5) repeat steps 1 to 4 for the left eye;
6) optionally, determine the average of the fixation points obtained for the left and right eyes.

As a variant, data D(t) representative, as a function of time, of measurements of the position of points being looked at by at least one eye of the initial wearer, at respective time instants during the performing of the visual task, may be obtained by the input 12 of the device 10. Based on such representative data D(t) as a function of time, an interpolation may be made in order to obtain the position of points being looked at, at any time instant during the performing of the visual task.

In an embodiment where the representative data D(t) result from direct measurements on the initial wearer, such measurements may be obtained by providing the wearer with a head-worn device during the visual task. The head-worn device may provide a tridimensional scan of the scene in a predetermined reference frame of the head and the gaze directions of the initial wearer. The head-worn device may comprise a frame, a tridimensional camera attached to that frame, and eye-trackers. Thus, the position of object points in the head reference frame and the gaze directions in the head reference frame may be obtained and from that information, the position of the fixation points in the head reference frame may be computed by ray-tracing as detailed below with reference to FIG. 2 and the parameter(s) of interest I may then be determined.

The processor 14 may be configured for determining the parameter(s) of interest I from the points being looked at, for example by simulation.

For example, as a parameter of interest I, the monocular visual acuity loss for the left eye and right eye may be determined, by using a visual acuity model such as the one described in document WO-A-2017/064065; or the binocular visual acuity loss may be determined, by using the computed monocular visual acuity losses of the left and right eyes (acu_loss_left, acu_loss_right) and a binocular summation function (acu_loss_bino) such as, for example, acu_loss_bino=(acu_loss_left$^b$+acu_loss_right$^b$)$^{(1/b)}$ where b=7.3.

Figure 2:
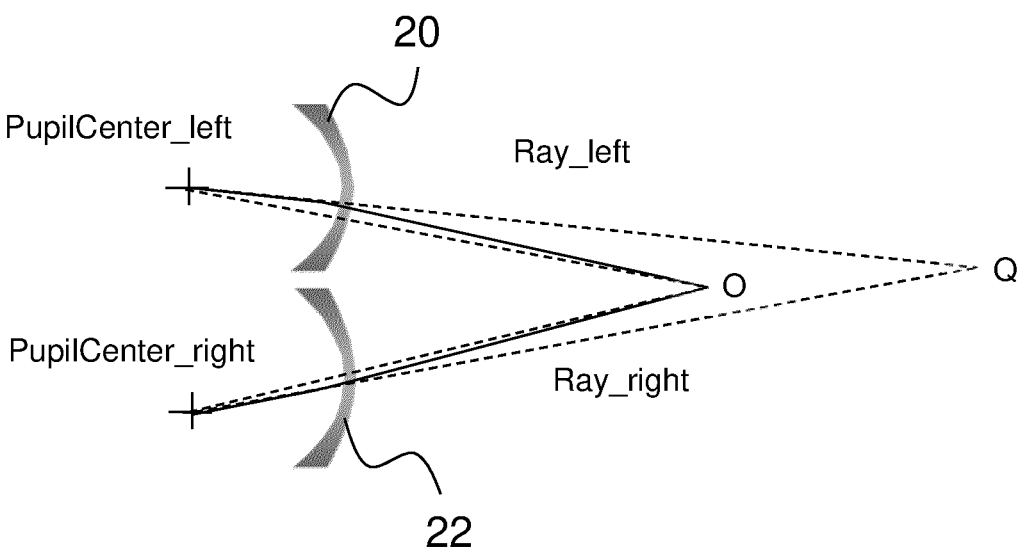
FIG. 2 is a schematic view of an example of determining distortion as a parameter of interest by a device according to the invention, in a particular embodiment.

As shown in FIG. 2, where a left ophthalmic lens 20 and a right ophthalmic lens 22 are positioned respectively in front of the left and right eyes, another example of a parameter of interest I which does not necessarily requires determining the fixation point is distortion.

In such an embodiment, the processor 14 may be configured for determining distortion from intersections between a left ray and a right ray corresponding to respective left and right eye gaze directions.

Namely, distortion may be determined according to a stereo distortion index, as follows:

1) consider an object point O;
2) perform ray tracing from the center of the pupil of the left eye, PupilCenter_left, to O. The ray emerging from PupilCenter_left is Ray_left;
3) perform ray tracing from the center of the pupil of the right eye, PupilCenter_right, to O. The ray emerging from PupilCenter_right is Ray_right;
4) compute a position Q as the point of intersection of Ray_left and Ray_right or, if the intersection does not exist, compute a position Q as the closest point between the two lines Ray_left and Ray_right;
5) Q is the perceived position of O according to a so-called "stereo index".

Two examples where the parameter of interest I is distortion are described below, where it is desired to evaluate the performance P of given visual equipments as a function of the distortion generated by those visual equipments during a stair climbing visual task.

Example 1

Figure 3:
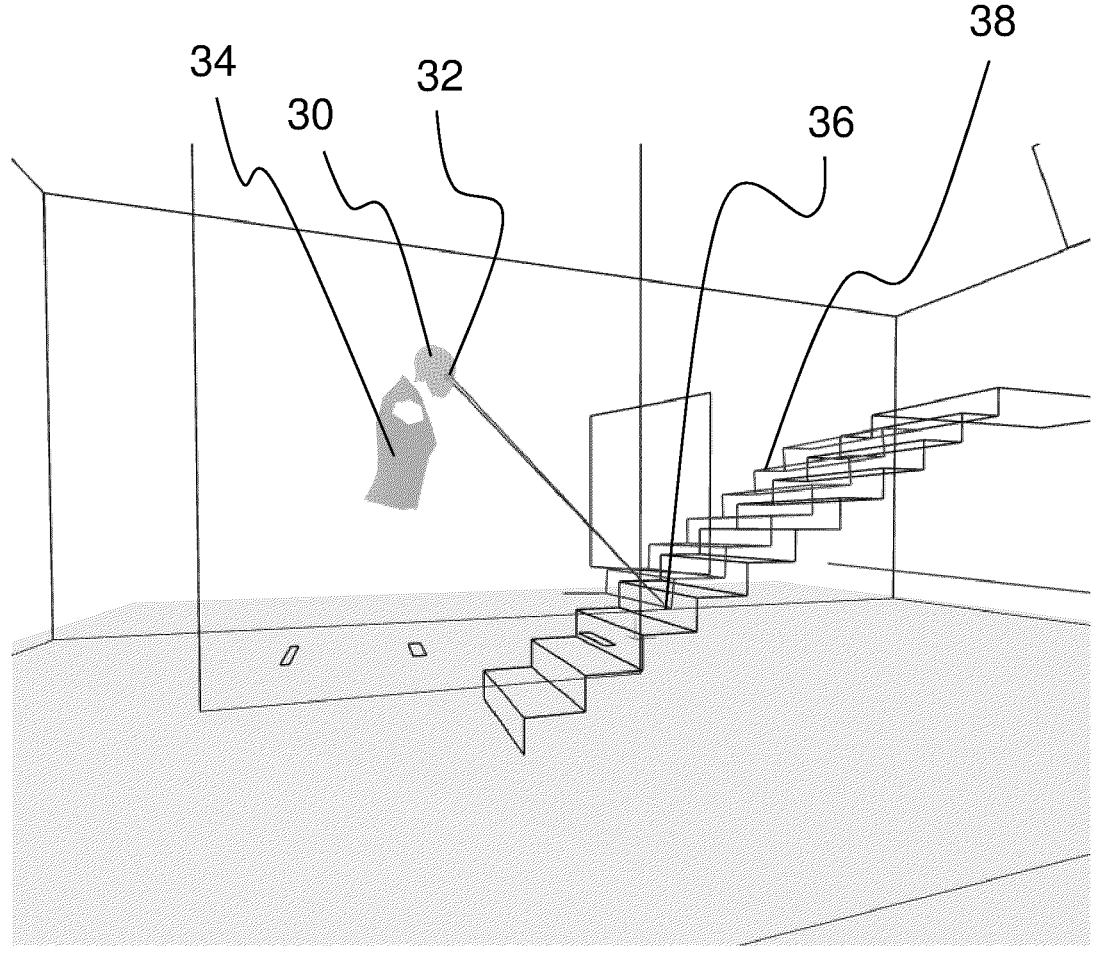
FIG. 3 is a schematic view of a first example of determining, by a device according to a particular embodiment of the invention, a fixation point and distortion during a stair climbing visual task performed by a wearer of a first visual equipment.

A first visual equipment is considered. As shown in FIG. 3, an experiment is defined where a wearer wearing the first visual equipment is performing the stair climbing visual task. FIG. 3 shows the head 30, the eyes 32 and the trunk 34 of the modeled wearer.

During the visual task, the gaze directions, the head position and the trunk position of the wearer are recorded.

The fixation point 36 can then be computed as a function of time, as described above.

Using a distortion model, the perceived position 38 of the stairs as a function of time can be computed and is shown in FIG. 3.

Example 2

Figure 4:
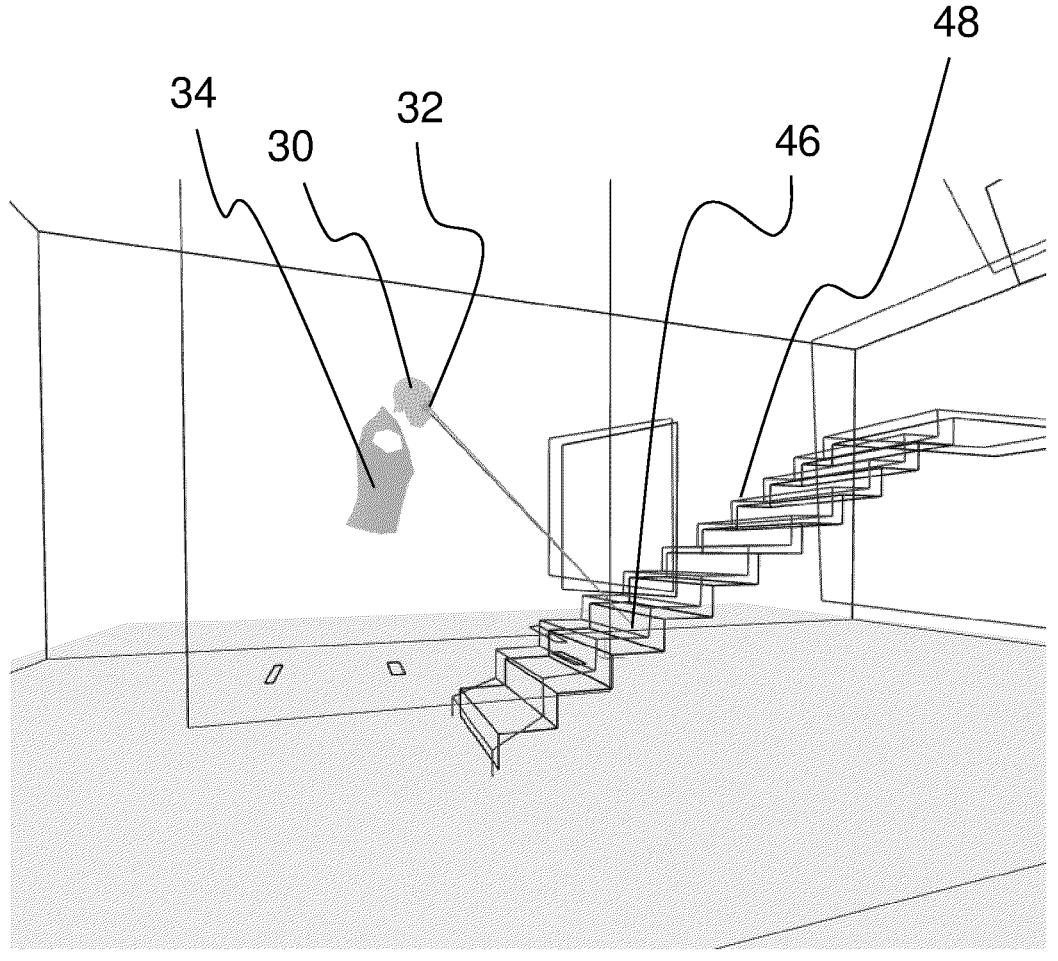
FIG. 4 is a schematic view of a second example of determining, by a device according to a particular embodiment of the invention, a fixation point and distortion during a stair climbing visual task performed by a wearer of a second visual equipment.

A second visual equipment different from the first visual equipment is considered. As shown in FIG. 4, the same experiment as in Example 1 is defined where a wearer wearing the second visual equipment is performing the same stair climbing visual task. FIG. 4 also shows the head 30, the eyes 32 and the trunk 34 of the modeled wearer. The same experimental data as in Example 1 are used.

The virtual performing of the visual task by the target wearer can be modeled using the recorded head positions, the recorded trunk positions, the computed fixation points 46 and the parameters of the second visual equipment.

The second visual equipment, similarly to the first visual equipment, can be modeled by the geometry and position of the lenses, the material, the coatings or transmission. The second visual equipment may have for example a different design (distribution of power and astigmatism over the lens), or the prescription may be modified, or the positioning and/or coating and/or transmission may be different.

The gaze directions of the wearer through the second visual equipment to look at the computed fixation points 46 can be computed.

For example, it can be assumed that the head position and the fixation points are the same as with the first visual equipment. The gaze directions with the second visual equipment may be obtained by ray tracing from the centers of rotation of the eyes to the fixation point, through the second visual equipment.

The parameters of interest I, such as the distortions of the stairs through the second visual equipment, shown in FIG. 4 by the perceived position 48 of the stairs as a function of time, can then be computed.

By comparing the perceived positions 38 and 48 of the stairs in FIGS. 3 and 4, it can be seen that the distortions are lower with the second visual equipment than with the first visual equipment.

In a particular embodiment where the target visual equipment is different from the initial visual equipment (such as in Examples 1 and 2) or the target wearer is different from the initial wearer, the processor 14 may be further configured for determining the position of the head of the target wearer of the target visual equipment from at least the points being looked at and, in the virtual performing of the visual task with the target visual equipment, the processor 14 is configured for using the determined position of the head of the target wearer of the target visual equipment instead of a position of the head of the initial wearer of the initial visual equipment.

In that embodiment, the processor 14 may be configured for determining the position of the head of the target wearer from visual acuity of the initial wearer of the initial visual equipment.

In that embodiment, the performance P of the target visual equipment for the given visual task can be evaluated as a function of the parameters of interest I with the target visual equipment. The parameters of interest I can for example be determined as follows:

1) compute the fixation point at each time instant as described previously; it can be assumed that the fixation points are similar when using the target visual equipment and when using the initial visual equipment;
2) determine the visual acuity with which the fixation point was seen as described previously; it can be assumed that the visual acuity is similar when using the target visual equipment and when using the initial visual equipment;
3) compute the head posture for looking at each computed fixation point, using the target visual equipment, with the determined visual acuity, for example as a function of punctual deviations of visual acuity with respect to the determined visual acuity, corresponding to multiple possible head postures;

4) determine the parameters of interest I with the target visual equipment.

Figure 5:
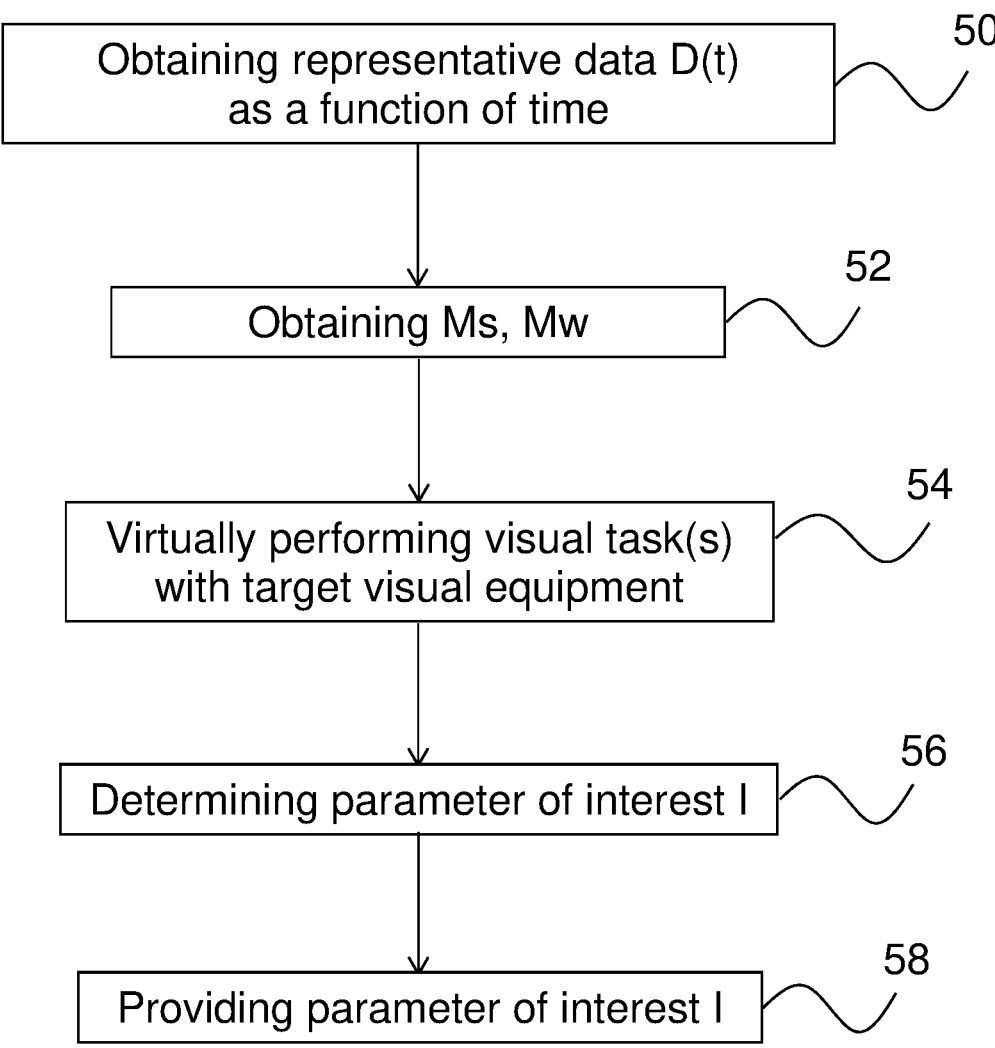
FIG. 5 is a flow diagram showing steps of a method according to the invention, in a particular embodiment.

The flow diagram of FIG. 5 shows steps of a method according to the invention for evaluating a performance of a visual equipment for at least one visual task.

A first step 50 comprises obtaining data D(t) representative, as a function of time, of measurements as a function of time of at least one parameter associated with an initial wearer of an initial visual equipment performing the at least one visual task in a scene, for example as described above in relationship with the device according to the disclosure.

Another step 52, which may be carried out before step 50, or simultaneously to step 50, or after step 50 comprises obtaining the model Ms of the scene where the at least one visual task is performed and the model Mw of the target wearer, for example as described above in relationship with the device according to the disclosure.

A following step 54 comprises virtually performing the visual task(s) with the target visual equipment by using the model Ms of the scene and the model Mw of the wearer, and by applying the representative data D(t) as a function of time to the model Mw of the target wearer having the target visual equipment in performing the visual task(s) in the model Ms of the scene, for example as described above in relationship with the device according to the disclosure.

Then, a step 56 comprises determining, on the basis of the virtual performing, at least one parameter of interest I, for example as described above in relationship with the device according to the disclosure.

A last step 58 comprises providing the at least one parameter of interest I, so as to determine to which extent the target visual equipment is appropriate for the target wearer. Such determination is made by evaluating the performance of the target visual equipment as a function of the at least one parameter of interest I, for example as described above in relationship with the device according to the disclosure.

In a particular embodiment, the method according to the invention is computer-implemented. Namely, a computer program product comprises one or more sequences of instructions that are accessible to a processor and that, when executed by the processor, cause the processor to carry out steps of the method for evaluating a performance of a target visual equipment for at least one visual task as described above.

The respective models Ms of the scene and Mw of the target wearer may be built for example remotely in a cloud, or locally in a computer.

The sequence(s) of instructions may be stored in one or several computer-readable storage medium/media, including a predetermined location in a cloud.

Although representative methods and devices have been described in detail herein, those skilled in the art will recognize that various substitutions and modifications may be made without departing from the scope of what is described and defined by the appended claims.

The invention claimed is:

1. A device for evaluating a performance of a target visual equipment for at least one visual task, comprising:

at least one input adapted to:
  obtain, from at least one of a gaze tracking device and a motion tracking device, data representative as a function of time of measurements of at least one parameter associated with an initial wearer of an initial visual equipment performing said at least one visual task in a three-dimensional scene;

obtain a three-dimensional model of the scene where said at least one visual task is performed; and obtain a model of a target wearer, comprising:
  a head;
  at least one eye movable relative to the head; and
  at least one lens of said target visual equipment;

at least one processor configured for:

virtually performing said at least one visual task with said target visual equipment by using said scene model and said target wearer model, and by applying said representative data as a function of time to the model of said target wearer having said target visual equipment in performing said visual task in the model of the scene, wherein said virtual performing comprises performing ray tracing originating from the center of rotation of the at least one eye of the target wearer model, through the at least one lens of the target visual equipment, to compute an intersection with an object in the three-dimensional model of the scene to determine a fixation point;

determining, on the basis of said virtual performing, at least one parameter of interest; and providing said at least one parameter of interest, so as to determine to which extent said target visual equipment is appropriate for said target wearer, by evaluating the performance of said target visual equipment as a function of said at least one parameter of interest.

2. The device according to claim 1, wherein said representative data pertain to at least one of at least one gaze direction and a position of the head of said initial wearer as a function of time.

3. The device according to claim 2, wherein said representative data pertain to a position of the trunk of said initial wearer as a function of time.

4. The device according to claim 3, wherein in virtually performing said at least one visual task, said processor is configured for applying as a function of time at least one of said at least one gaze direction, the position of the head and the position of the trunk of the initial wearer to said target wearer.

5. The device according to claim 3, wherein said model of said scene comprises at least one object defined by at least one geometric parameter and by a position of said object in said scene.

6. The device according to claim 2, wherein in virtually performing said at least one visual task, said processor is configured for applying as a function of time at least one of said at least one gaze direction, the position of the head and the position of the trunk of the initial wearer to said target wearer.

7. The device according to claim 6, wherein said model of said scene comprises at least one object defined by at least one geometric parameter and by a position of said object in said scene.

8. The device according to claim 2, wherein said model of said scene comprises at least one object defined by at least one geometric parameter and by a position of said object in said scene.

9. The device according to claim 2, wherein said model of said target wearer comprises a head, at least one eye movable with respect to said head and at least one ophthalmic lens of said target visual equipment cooperating with said at least one eye.

10. The device according to claim 1, wherein said model of said scene comprises at least one object defined by at least one geometric parameter and by a position of said object in said scene.

11. The device according to claim 1, wherein said model of said target wearer comprises a head, at least one eye movable with respect to said head and at least one ophthalmic lens of said target visual equipment cooperating with said at least one eye.

12. The device according to claim 11, wherein said model of said target wearer further comprises a modeled trunk.

13. The device according to claim 1, wherein said at least one processor is further configured for determining the position of points being looked at by at least one eye of the initial wearer at respective time instants during the performing of said at least one visual task.

14. The device according to claim 13, wherein said at least one processor is configured for determining said at least one parameter of interest from said points being looked at.

15. The device according to claim 14, wherein, said target visual equipment being different from said initial visual equipment or said target wearer being different from said initial wearer, said at least one processor is further configured for determining the position of the head of the target wearer of said target visual equipment from at least said points being looked at and, in said virtual performing, said at least one processor is configured for using the determined position of the head of the target wearer of said target visual equipment instead of a position of the head of the initial wearer of said initial visual equipment.

16. The device according to claim 15, wherein said at least one processor is configured for determining said position of the head of said target wearer from visual acuity of said initial wearer of said initial visual equipment.

17. The device according to claim 1, wherein said representative data pertain to the position of points being looked at by at least one eye of the initial wearer at respective time instants during the performing of said at least one visual task.

18. The device according to claim 1, wherein said at least one parameter of interest pertains to a group including a monocular visual acuity for the target wearer's left and/or right eye, a monocular visual acuity loss for the target wearer's left and/or right eye, a binocular visual acuity, a binocular visual acuity loss, an accommodation level, an optical flow, a distortion, a vergence state.

19. A method for evaluating a performance of a target visual equipment for at least one visual task, the method comprising:

obtaining, from at least one of a gaze tracking device and a motion tracking device, data representative as a function of time of measurements of at least one parameter associated with an initial wearer of an initial visual equipment performing said at least one visual task in a three-dimensional scene;

obtaining a three-dimensional model of the scene where said at least one visual task is performed;

obtaining a model of a target wearer;, comprising:

a head;

at least one eye movable relative to the head; and at least one lens of said target visual equipment;

virtually performing by at least one processor said at least one visual task with said target visual equipment by using said scene model and said target wearer model, and by applying said representative data as a function of time to the model of said target wearer having said target visual equipment in performing said visual task in the model of the scene, wherein said virtual performing comprises performing ray tracing originating from the center of rotation of the at least one eye of the target wearer model, through the at least one lens of the target visual equipment, to compute an intersection with an object in the three-dimensional model of the scene to determine a fixation point;

determining by at least one processor, on the basis of said virtual performing, at least one parameter of interest; and providing said at least one parameter of interest, so as to determine to which extent said target visual equipment is appropriate for said target wearer, by evaluating the performance of said target visual equipment as a function of said at least one parameter of interest.

20. A non-transitory computer-readable medium on which is stored a computer program for evaluating a performance of a target visual equipment for at least one visual task, wherein the computer program comprises one or more sequences of instructions that are accessible to a processor and that, when executed by said processor, cause said processor to perform:

obtaining, from at least one of a gaze tracking device and a motion tracking device, data representative as a function of time of measurements of at least one parameter of an initial wearer of an initial visual equipment performing said at least one visual task in a three-dimensional scene;

obtaining a three-dimensional model of the scene where said at least one visual task is performed;

obtaining a model of a target wearer;-, comprising:

a head;

at least one eye movable relative to the head; and at least one lens of said target visual equipment;

virtually performing said at least one visual task with said target visual equipment by using said scene model and said target wearer model, and by applying said representative data as a function of time to the model of said target wearer having said target visual equipment in performing said visual task in the model of the scene, wherein said virtual performing comprises performing ray tracing originating from the center of rotation of the at least one eye of the target wearer model, through the at least one lens of the target visual equipment, to compute an intersection with an object in the three-dimensional model of the scene to determine a fixation point;

determining, on the basis of said virtual performing, at least one parameter of interest; and providing said at least one parameter of interest, so as to determine to which extent said target visual equipment is appropriate for said target wearer, by evaluating the performance of said target visual equipment as a function of said at least one parameter of interest.

\* \* \* \* \*